US012593947B2

(12) United States Patent (10) Patent No.: US 12,593,947 B2
Lee (45) Date of Patent: Apr. 7, 2026

(54) ROBOT CLEANER

(71) Applicant: LG ELECTRONICS INC., Seoul (KR)

(72) Inventor: Seungjin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 549 days.

(21) Appl. No.: 18/014,879

(22) PCT Filed: Dec. 9, 2020

(86) PCT No.: PCT/KR2020/017951
§ 371 (c)(1),
(2) Date: Jan. 6, 2023

(87) PCT Pub. No.: WO2022/010052
PCT Pub. Date: Jan. 13, 2022

(65) Prior Publication Data
US 2023/0218132 A1 Jul. 13, 2023

(30) Foreign Application Priority Data
Jul. 6, 2020 (KR) ........................ 10-2020-0082848

(51) Int. Cl.
*A47L 9/00* (2006.01)
*A47L 9/28* (2006.01)
(Continued)

(52) U.S. Cl.
CPC ............. *A47L 9/009* (2013.01); *A47L 9/2852* (2013.01); *A47L 2201/04* (2013.01); *B60C 2011/1361* (2013.01); *B60C 11/1606* (2013.01)

(58) Field of Classification Search
CPC .... A47L 9/009; A47L 9/2852; B60C 11/1606; B60C 2011/1361; B60B 3/001; B62B 5/02
See application file for complete search history.

(56) References Cited

U.S. PATENT DOCUMENTS 6,633,150 B1 10/2003 Wallach et al.

FOREIGN PATENT DOCUMENTS

| DE | 102008009617 A1 * | 8/2009 | .............. A47L 11/40 |
| IT | CA20110004 A1 * | 9/2012 | .............. B60B 9/14 |
(Continued)

*Primary Examiner* — S. Joseph Morano
*Assistant Examiner* — Alex Palmer
(74) *Attorney, Agent, or Firm* — Birch, Stewart, Kolasch & Birch, LLP

(57) ABSTRACT

A robot cleaner is disclosed. The robot cleaner according to an embodiment of the present disclosure comprises: a body; a wheel cover; a drive module; and a wheel, wherein the wheel comprises: a wheel body coupled to the drive module and forming the appearance of the wheel; a plurality of tread portions arranged along the circumferential surface of the wheel body and spaced apart from each other; cutout portions formed between the tread portions at the circumferential surface of the wheel body; and a rib member comprising a ring portion received in the wheel body and rib portions protruding radially outward of the wheel from the ring portion through the cutout portions, wherein the rib member comprises an elastic material and is thus provided such that the rib portions are retracted inside the wheel body when a force is applied radially inward of the wheel.

11 Claims, 10 Drawing Sheets

(51) Int. Cl.
   *B60C 11/13* (2006.01)
   *B60C 11/16* (2006.01)

(56) References Cited

FOREIGN PATENT DOCUMENTS

| JP | 62-225409 | A | 10/1987 |
| KR | 10-2005-0122118 | A | 12/2005 |
| KR | 10-2009-0013349 | A | 2/2009 |
| KR | 10-1480639 | B1 | 1/2015 |
| KR | 10-2015-0126126 | A | 11/2015 |
| KR | 10-2016-0104056 | A | 9/2016 |
| KR | 10-2018-0079068 | A | 7/2018 |

* cited by examiner

【Fig.4】
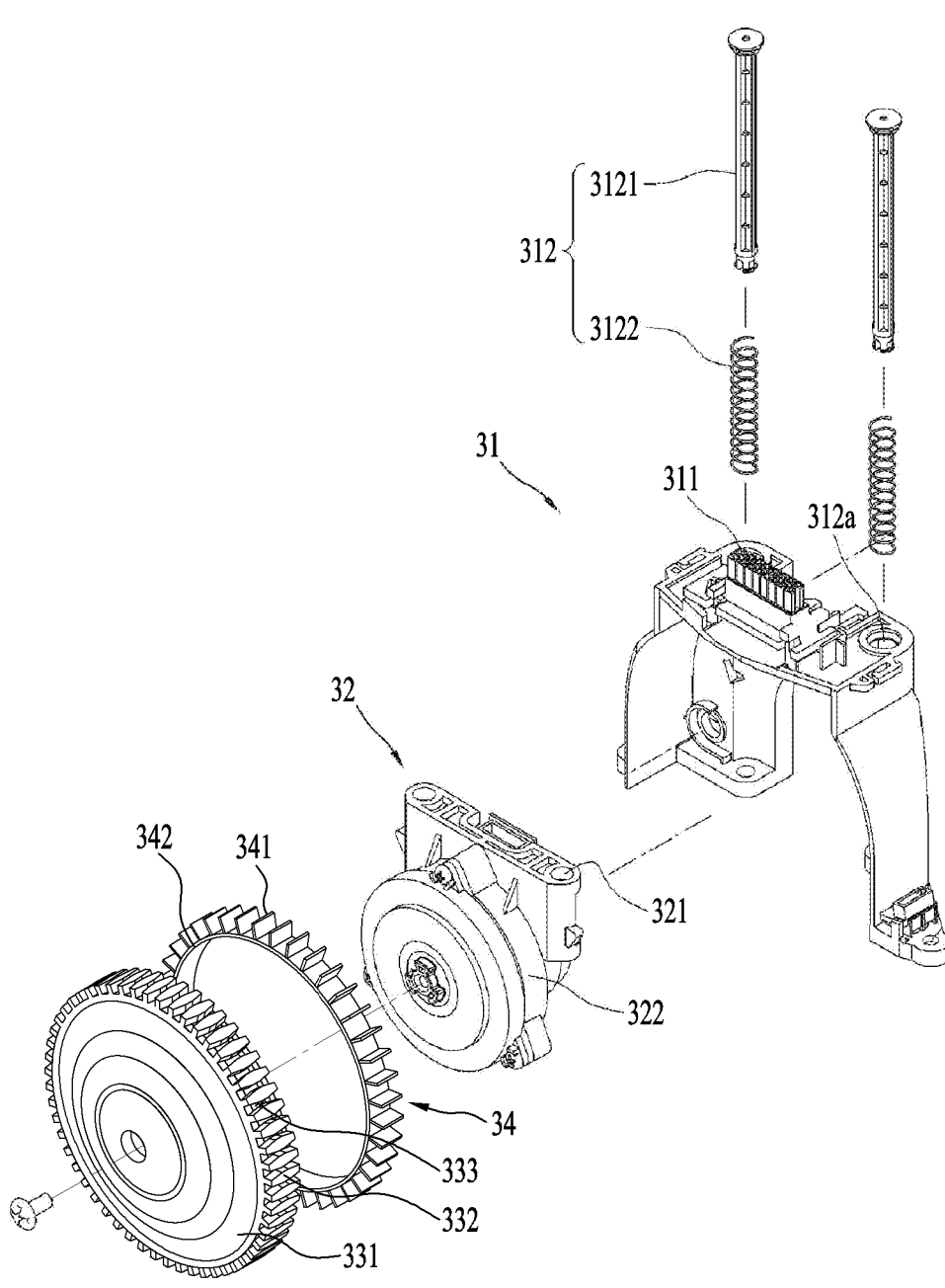

【Fig.5】
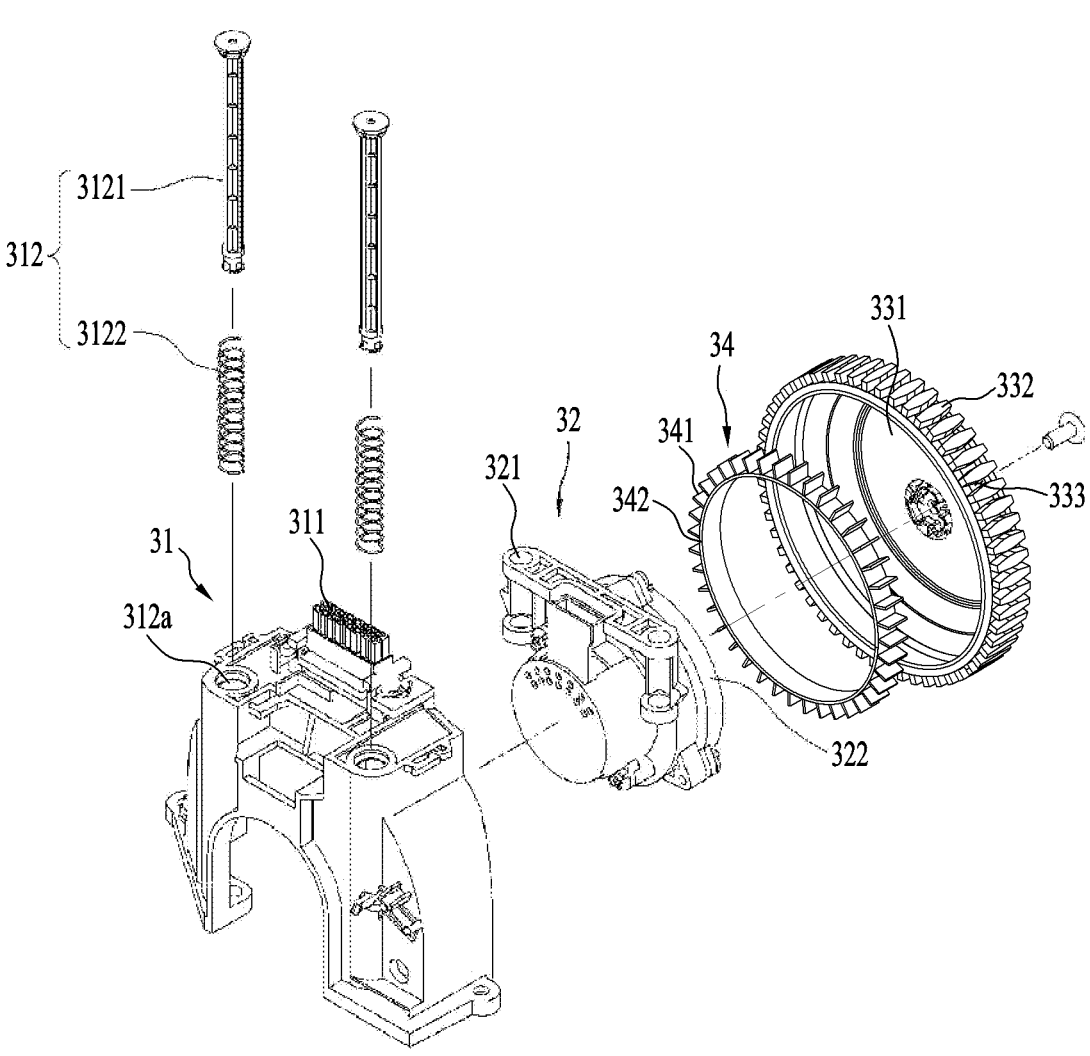

【Fig.6】
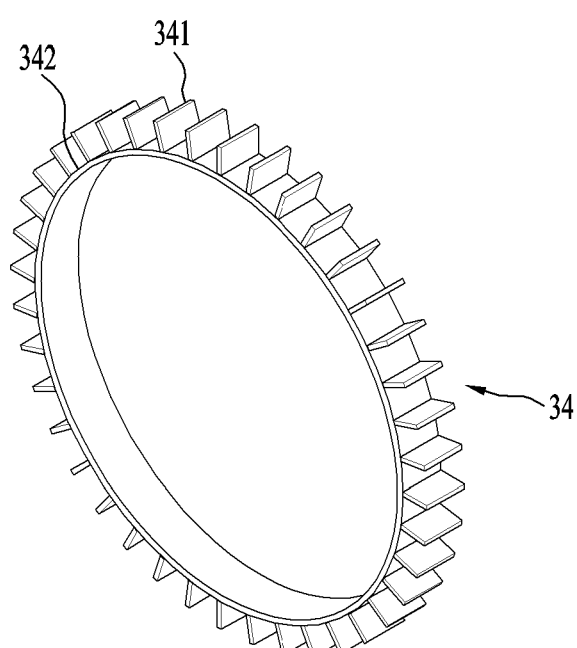

【Fig.7】
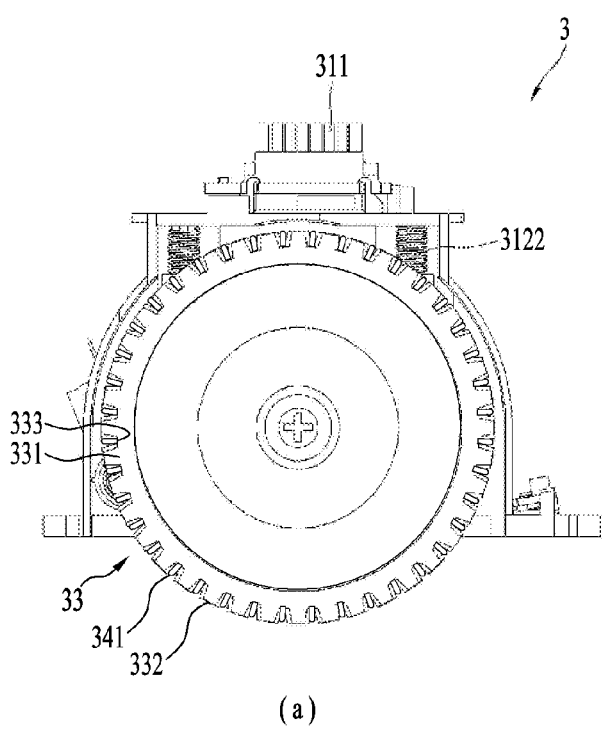
(a)
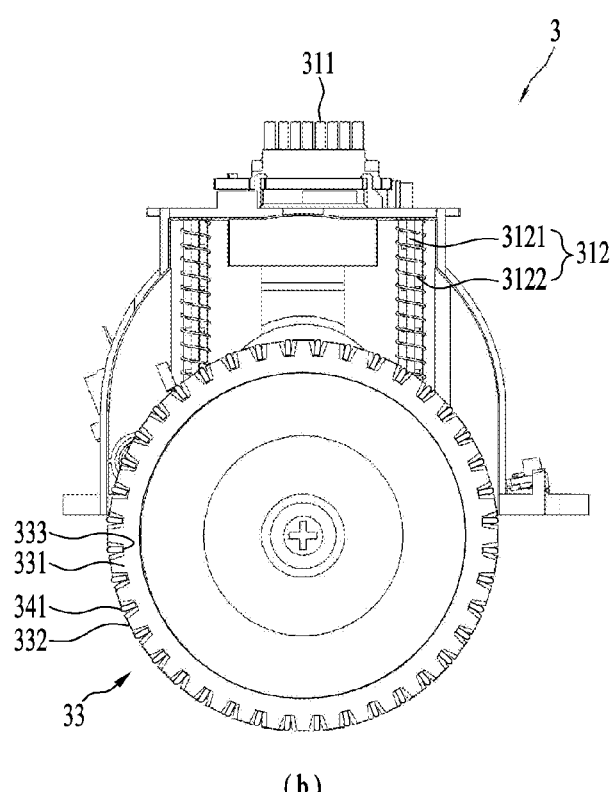
(b)

【Fig.9】
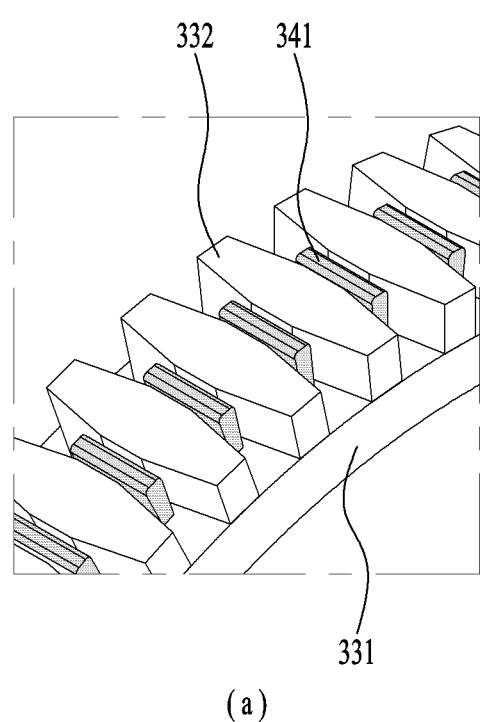
(a)
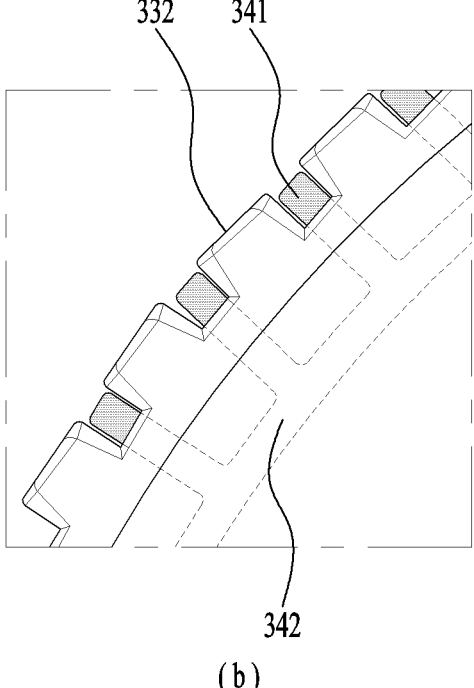
(b)

【Fig.10】
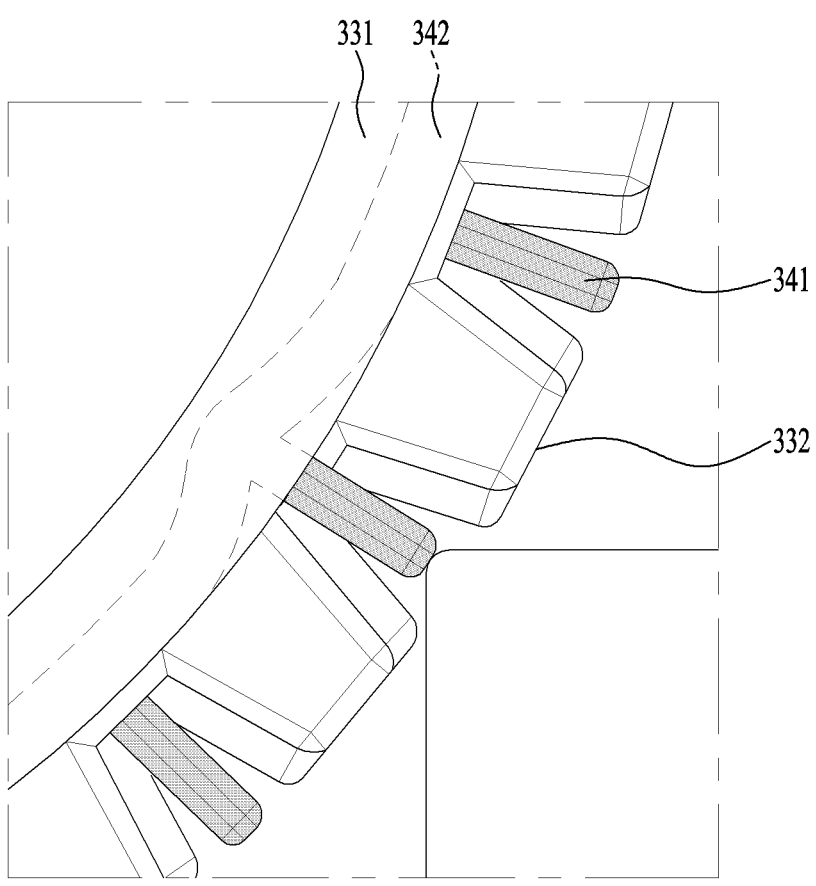

ROBOT CLEANER

CROSS REFERENCE TO RELATED APPLICATIONS

This application is the National Phase of PCT International Application No. PCT/KR2020/017951, filed on Dec. 9, 2020, which claims priority under 35 U.S.C. 119 (a) to Patent Application No. 10-2020-0082848, filed in the Republic of Korea on Jul. 6, 2020, all of which are hereby expressly incorporated by reference into the present application.

TECHNICAL FIELD

The present disclosure relates to a robot cleaner.

BACKGROUND ART

Generally, humans clean their living spaces for hygiene and cleanliness. There are many reasons for such cleaning. For example, humans may perform cleaning to protect their bodies from disease or to prevent damage to their respiratory organs such as a bronchus, and may also clean their spaces to improve the quality of life by staying in a clean space.

Dust or foreign materials may settle to the floor of a room due to gravity. Therefore, in order to clean the room, people tend to strain their backs or joints because they have to perform cleaning while bending over or sitting down.

To this end, cleaners that assist people in cleaning have recently appeared. The cleaners can be roughly classified into a stick-type cleaner, a bar-type cleaner, a robot cleaner, etc.

The robot cleaner from among the above cleaners may clean a specific space such as a home or an office instead of a user. Generally, the robot cleaner may clean a target area to be cleaned by sucking dust from the target area.

Tread patterns may be formed on wheels of the robot cleaner for stable driving. However, in a cleaning target area to be cleaned, such as a home or an office where the robot cleaner is driven, electric wires for use in home appliances or foreign substances each having a large particle diameter may be caught between tread patterns, which may interfere with stable driving.

In particular, Patent Document 1 and Patent Document 2 have disclosed that ribs are formed between tire tread patterns. However, Patent Document 1 is a document about automobile tires, and is different in application range from tires of the robot cleaner.

PATENT DOCUMENTS (Patent document 1) Korean Patent Laid-Open Publication No. 10-2013-0117131

(Patent Document 2) Korean Patent Laid-Open Publication No. 10-2016-7020870

DISCLOSURE

Technical Problem

An object of the present disclosure is to provide a robot cleaner capable of effectively preventing foreign substances from being caught in wheels.

Another object of the present disclosure is to provide a robot cleaner capable of effectively guaranteeing climbing performance thereof while preventing foreign substances from being caught in wheels.

Technical Solution

One embodiment of the present disclosure provides a robot cleaner in which the shape of a tread formed on a wheel is changed. Specifically, the embodiments of the present disclosure provide a robot cleaner capable of preventing climbing performance deterioration to be generated when foreign substances are prevented from being caught between treads.

In particular, thin ribs are bent when the robot cleaner climbs a stepped terrain such as a threshold, so that the robot cleaner can easily perform climbing.

In accordance with an aspect of the present disclosure, a robot cleaner may include: a main body configured to form an exterior appearance of the robot cleaner: a wheel cover detachably provided to the main body: a drive module movably coupled to the wheel cover; and a wheel coupled to the drive module and rotated by receiving driving force from the drive module.

The wheel may include: a wheel body coupled to the drive module and forming an exterior appearance of the wheel: a plurality of tread portions spaced apart from each other along a circumferential surface of the wheel body: at least one cutout portion formed between the tread portions at the circumferential surface of the wheel body.

The wheel may further include a rib member including a ring portion accommodated in the wheel body and rib portions protruding outward in a radial direction of the wheel from the ring portion through the cutout portions.

The rib member may include an elastic material so that the rib portions are inserted into the wheel body when force is applied radially to an inside of the wheel.

The rib member may be elastically restored to its original position when external force is removed after the rib portions are inserted into the wheel body.

The rib portions may be provided to have the same height as the tread portions, and each of the rib portions may be provided to have a lower height than each of the tread portions.

Each of the rib portions may be provided to have a smaller width than each of the tread portions. Each of the cutout portions may be provided to have a width corresponding to a width of each rib portion.

The drive module may be provided to be movable up and down in the wheel cover, and each of the rib portions may be provided to have a specific height where the rib portions are not in contact with the wheel cover in a state where the drive module is maximally in close contact with the wheel cover.

The rib member may be detachably coupled to the wheel body. The cutout portion may be provided as a plurality of cutout portions, so that each of the cutout portions may be provided between the tread portions. The rib portions may be provided in a remaining portion except for some of the plurality of cutout portions.

The rib portions may protrude outward in a radial direction of the wheel so as to have the same height. The cutout portion may be provided as a plurality of cutout portions, so that each of the cutout portions is provided between the tread portions. Each of the rib portions may be provided in each of the plurality of cutout portions, but at least one of the rib portions may have a height different from that of the remaining cutout portions other than the at least one rib portion.

Advantageous Effects

As is apparent from the above description, the embodiments of the present disclosure may provide a robot cleaner capable of performing stable driving without being disturbed by foreign substances such as electric wires.

The embodiments of the present disclosure may provide a robot cleaner capable of effectively performing cleaning because climbing performance of the robot cleaner is not deteriorated even when a member capable of preventing foreign substances from being caught between treads is formed.

In addition, the robot cleaner according to the embodiments of the present disclosure can prevent foreign substances from being caught in wheels of the robot cleaner so that a user does not have to continuously monitor a driving situation of the robot cleaner so as to recognize whether the robot cleaner malfunctions, thereby maximizing user convenience.

DESCRIPTION OF DRAWINGS

FIGS. 4 and 5 are exploded perspective views illustrating the drive unit of the robot cleaner according to an embodiment of the present disclosure.

FIG. 6 is a perspective view illustrating a rib member according to an embodiment of the present disclosure.

FIG. 7 is a view illustrating the operation of a drive unit according to an embodiment of the present disclosure.

FIG. 9 is a view illustrating various examples of a rib portion according to an embodiment of the present disclosure.

FIG. 10 is a view illustrating the operation of a robot cleaner according to an embodiment of the present disclosure.

BEST MODE

Figure 1:
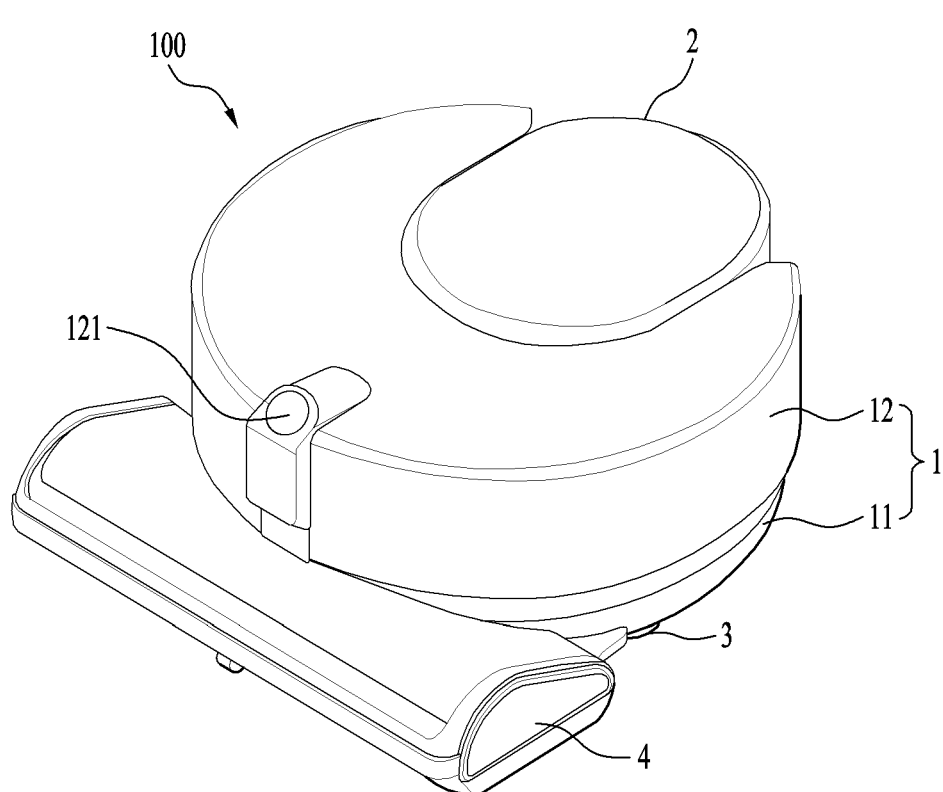
FIG. 1 is a perspective view illustrating a robot cleaner according to an embodiment of the present disclosure.

Hereinafter, embodiments of the present disclosure will be described in detail with reference to the accompanying drawings so that the present disclosure may be easily realized by those skilled in the art.

However, the present disclosure may be achieved in various different forms and is not limited to the embodiments described herein. In the drawings, parts that are not related to a description of the present disclosure are omitted to clearly explain the present disclosure and similar reference numbers will be used throughout this specification to refer to similar parts.

In the present specification, redundant descriptions of the same components are omitted.

It will be understood that, when an element is referred to as being "connected to" another element, the element can be connected to the other element or intervening elements may also be present. In contrast, when an element is referred to as being "directly connected to" another element, there are no intervening elements present.

Specific terminology used in this specification is only for convenience of description and is not intended to be limiting of the illustrative embodiments.

A singular representation may include a plural representation unless it represents a definitely different meaning from the context.

In description of the present disclosure, the terms "comprising," "including," and "having" shall be understood to designate the presence of particular features, numbers, steps, operations, elements, parts, or combinations thereof, but not to preclude the presence or addition of one or more other features, numbers, steps, operations, elements, parts, or combinations thereof.

In description of the present disclosure, the term "and/or" may include a combination of a plurality of items or any one of a plurality of listed items. For example, "A or B" may include "only A", "only B", and/or "both A and B".

FIG. 1 is a perspective view illustrating a robot cleaner 100 according to an embodiment of the present disclosure.

Referring to FIG. 1, the robot cleaner 100 may include a main body 1, a dust collector 2, and a drive unit 3. In addition, the robot cleaner 100 may further include a battery (not shown) for providing power so that the above-described drive unit and the dust collector can be electrically operated.

The battery may be provided as a secondary battery so that the battery can be repeatedly charged and discharged. Therefore, when the remaining battery lifespan is low in level, the user can allow the battery of the robot cleaner to be repeatedly charged with electricity without replacing the battery with a new battery or adding a new battery, so that the user can use the robot cleaner.

When the battery is provided as a secondary battery, the robot cleaner 100 may further include a charging stand (not shown) through which the robot cleaner can be charged with electricity.

Of course, the battery may be provided as a battery other than a secondary battery. In this case, when the capacity of the battery is fully consumed, it may be necessary to replace the battery with a new battery.

That is, there is no limitation on the manner in which the robot cleaner receives power. The main body 1 may be provided to form the exterior appearance of the robot cleaner 100.

The main body 1 may include a first housing 11 and a second housing 12.

The first housing 11 may form a portion of the main body 1, and may provide a space in which electronic components required for the robot cleaner 100 or components required for the robot cleaner 100 are mounted.

For example, a controller (not shown) for controlling the operation of the robot cleaner 100 may be mounted to the robot cleaner 100.

In addition, the first housing 11 may include a flow passage (not shown) through which air containing dust is guided to a dust collector 2 to be described later. That is, air suctioned through the suction unit 4 to be described later may be guided to the dust collector 2 after passing through the inner space of the first housing 11.

The second housing 12 may be provided in the form of a cover that covers the first housing 11, but is not limited thereto.

A display unit (not shown) may be provided on one surface of the second housing 12. The display unit may be provided in the form of a touch panel so that a user can easily input a command using the touch panel.

The second housing 12 may be provided to be coupled to the first housing 11. For example, the second housing 12 may be hinge-coupled to the first housing 11, or may be formed integrally with the first housing 11. However, it is preferable that the second housing 12 be separately provided in consideration of the installation convenience of components mounted to the first housing 11.

The second housing 12 can prevent components mounted to the first housing 11 from being contaminated or damaged by external foreign substances.

That is, the robot cleaner according to the present embodiment may be provided so that components mounted to the first housing 11 are covered by the second housing 12 and not exposed to the outside. Therefore, when the components of the robot cleaner are operated, the user's body may be injured or damaged due to malfunction or user's carelessness. Accordingly, the main body 1 can prevent accidents by covering internal components. In addition, due to the presence of the main body 1, the complex interior components of the robot cleaner are not exposed to the outside, and thus the aesthetics of the robot cleaner can be improved.

The sensor unit 121 may be provided in the main body 1. The sensor unit 121 may provide image information so that the robot cleaner 100 can travel in the cleaning target area to be cleaned. The sensor unit 121 may be a camera or a photographing sensor.

Specifically, the sensor unit 121 may collect information necessary for autonomous driving of the robot cleaner 100.

For example, the sensor unit 121 may include a photographing sensor for creating a driving map by photographing surroundings, an obstacle sensor for detecting obstacles, and the like. In addition, the sensor unit 121 may include not only the above-described sensors, but also additional sensors as needed.

For example, the sensor unit 121 may further include a wall detection sensor (not shown). Accordingly, information on the cleaning target area to be cleaned may be input to the robot cleaner 100 through the wall detection sensor and the photographing sensor. The robot cleaner 100 may recognize the shape of a space while moving in the space to be cleaned, and may divide the cleaning target area into a plurality of cleaning areas through the wall detection sensor, thereby creating the plurality of cleaning areas.

The dust collector 2 may be used to collect dust. The dust collector 2 may be provided with a cyclone unit (not shown). The dust collector 2 may communicate with the suction unit 4.

Air may be introduced into the robot cleaner by the dust collector 2. When the dust collector 2 suctions air and discharges the air having no dust to the outside, negative pressure is generated in the robot cleaner 100, and air containing dust may be introduced into the robot cleaner 100 through a suction-unit housing 41.

The dust collector 2 may be provided in a form in which relatively large dust is primarily separated from the air and relatively small dust is then secondarily separated from the air, but is not limited thereto. It should be noted that the dust collector 2 may suction dust present on the floor on which the robot cleaner moves.

The dust collector 2 may be detachably coupled to the main body 1. Therefore, when the robot cleaner finishes cleaning or excessive dust is accumulated in the dust collector 2, the user can easily separate the dust collector 2 to remove the dust, thereby guaranteeing user convenience.

The suction unit 4 may be coupled to the main body of the robot cleaner 100, so that the suction unit can perform cleaning.

The suction unit 4 may include a suction-unit housing 41 and a roller 42.

The suction unit 4 may be provided to clean a traveling surface on which the robot cleaner moves. Specifically, the suction unit 4 may be provided to suction dust present on the traveling surface.

The traveling surface may be a floor surface. When a carpet or the like is provided on the traveling surface, the traveling surface may also be a top surface of the carpet.

Dust may be suctioned into the space provided by the first housing 11 through the suction-unit housing 41. The suctioned dust may be collected in the dust collector 2 and the air having no dust may be discharged to the outside of the main body 1.

The suction-unit housing 41 may be coupled to the main body 1 to provide a space in which a mapping unit to be described later is accommodated.

In addition, the suction-unit housing 41 may provide a passage through which air containing dust can be suctioned so that dust present on the traveling surface can be removed.

Specifically, as described above, the suction-unit housing 41 may provide a space in which the roller 42 is accommodated so that the roller 42 can smoothly clean the traveling surface.

The connection relationship between the suction-unit housing 41 and the main body 1 is not limited. That is, the suction-unit housing 41 and the main body 1 may be formed integrally or separately. However, it is preferable that the main body 1 and the suction-unit housing 41 be provided separately from each other in terms of convenience of roller replacement when cleaning the inside of the roller or during malfunction of the roller.

Figure 2:
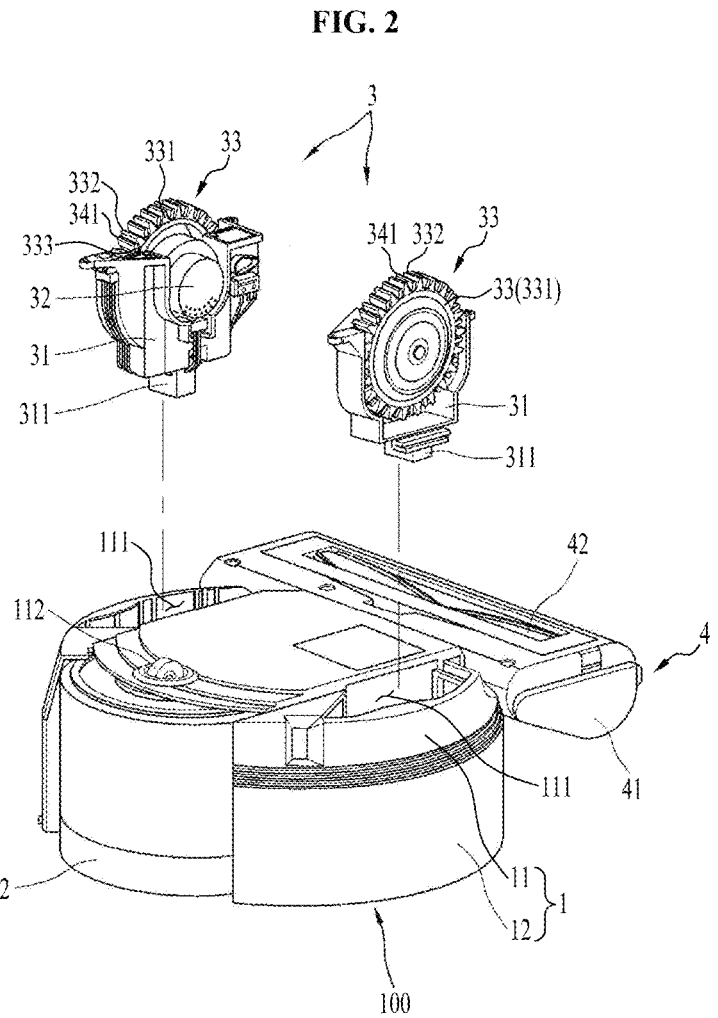
FIG. 2 is a view illustrating a bottom surface of the robot cleaner according to an embodiment of the present disclosure.
Figure 3:
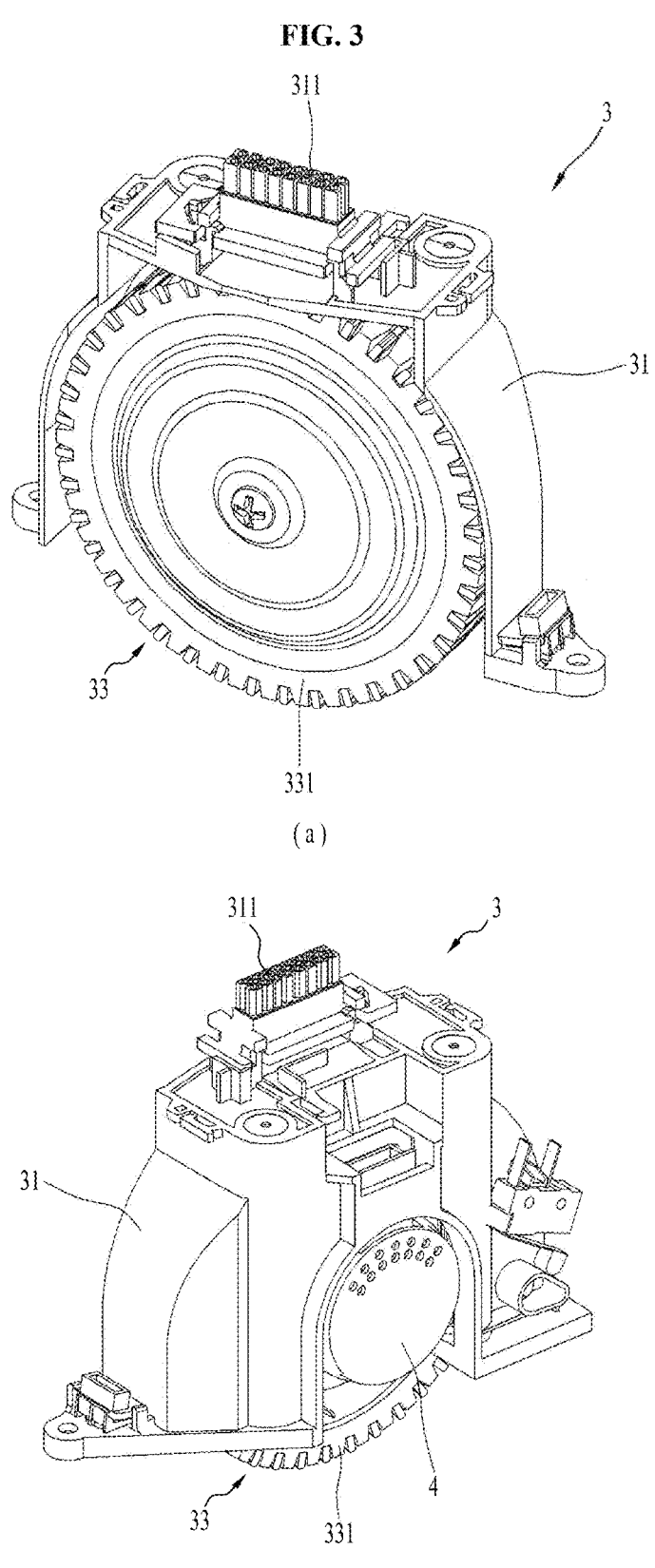
FIG. 3 is a view illustrating a drive unit of the robot cleaner according to an embodiment of the present disclosure.

FIG. 2 is a view showing a bottom surface of the robot cleaner according to an embodiment of the present disclosure.

The robot cleaner 100 may include a drive unit 3.

The drive unit 3 may be provided to move the main body 1. The drive unit 3 may be detachably coupled to the main body 1.

As shown in FIG. 2, the drive unit 3 may be equipped with a fastening unit 311, and the main body 1 may include an accommodation unit 111 in which the drive unit 3 can be accommodated. The accommodation unit 111 may include a coupling unit (not shown) having a shape corresponding to the fastening part 311. As the fastening unit 311 is connected to the coupling unit, the drive unit 3 may be coupled to the main body 1.

The fastening unit 311 and the coupling unit are connected to each other so that the drive unit 3 can be formed integrally with the main body 1. As a result, the main body 1 may move by the operation of the drive unit 3 so that the robot cleaner can clean the cleaning target area.

The accommodation unit 111 may be formed on the bottom surface of the robot cleaner 100.

The drive unit 3 may include a wheel cover 31, a drive module 32, and one or more wheels 33. Specifically, the drive unit 3 may include the drive module 32 for generating drive power, the wheels 33 rotatably provided by the drive module 32, and the wheel cover 31 formed to cover the drive module 32 and the wheels 33.

The wheel cover 31 may be a portion that provides a space for accommodating the drive module 32 and the wheels 33, which will be described later. Providing a space for allowing the wheel cover 31 to accommodate the drive module 32 and the wheels 33 may not simply mean that the wheel cover 31 surrounds the entirety of the drive module 33 and the wheels 33. That is, the wheel cover 31 may be formed to provide a space in which the wheels 33 and the drive module 32 are seated.

The above-described fastening unit 311 may be provided in the wheel cover 31 such that the drive unit 3 can be coupled to the main body 1.

The drive module 32 may be provided to generate driving force and transmit driving force to the wheels 33, and may be coupled to the wheel cover 31 to be movable up and down. Such vertical movement of the drive module 32 may be guided by a guide bar 3121 of a buffer unit 312 to be described later. Detailed configuration of the drive module 32 will be described in detail later.

The wheels 33 may be provided to rotate by receiving electrical power. Wheels 33 may be provided at both sides of the main body 1, respectively.

The wheel 33 provided at one side of the main body 1 and the other wheel 33 provided at the other side of the main body 1 may be controlled separately from each other. That is, the wheel 33 provided at one side of the main body 1 and the other wheel 33 provided at the other side of the main body 1 may rotate at different rotational speeds.

Accordingly, the robot cleaner 100 can rotate left or right. In addition, the robot cleaner 100 can also change the movement direction to another direction in combination with forward movement or backward movement.

That is, the driving speed of the robot cleaner 100 may be determined according to the rotational speed of the wheels 33, and the driving direction of the robot cleaner 100 may be determined according to a difference in rotational speed between the wheels 33.

For example, when the wheel 33 located at the left side of the robot cleaner maintains a stopped state and the other wheel 33 located at the right side of the robot cleaner rotates, the robot cleaner 100 may turn to the left. In a situation where both wheels 33 are operating, when the right wheel rotates faster than the left wheel 33, the robot cleaner turns to the left so that the robot cleaner can continuously move straight.

Since the robot cleaner 100 cleans the cleaning target area while moving in the cleaning target area, the suction-unit housing 41 may not smoothly move during movement of the robot cleaner. Therefore, an auxiliary wheel 112 may be provided for smooth driving of the robot cleaner. As the auxiliary wheel 112 is provided in the robot cleaner, the suction-unit housing 41 can more smoothly move during movement of the robot cleaner 100.

However, the scope or spirit of the present disclosure is not limited thereto, and it should be noted that the photographing sensor or the obstacle sensor can also simultaneously perform wall detection as needed.

The photographing sensor may be provided not only to detect the cleaning target area, but also to specify the position of the main body 1 in the previously input cleaning target area. Accordingly, the position of the space where the robot cleaner 100 performs cleaning may be specified, and the position of the robot cleaner 100 may be specified so that movement to the next cleaning area can be guided.

The type and number of sensor units 121 are not limited. That is, a plurality of photographing sensors may be provided in the robot cleaner. When the plurality of photographing sensors is provided, the photographing sensors may be provided as homogeneous or heterogeneous photographing sensors.

The robot cleaner 100 may be provided so that the suction strength of the dust collector 2 varies according to the material of the floor. This is because, if the dust collector 2 always suctions dust with the same strength, the robot cleaner may have difficulty in performing perfect cleaning on a special floor surface such as a carpet.

The robot cleaner 100 may include a floor sensor (not shown) to detect the material of the floor. The floor sensor may be a sensor for detecting the material of the floor. The floor sensor may be provided in the above-described sensor unit 121, or may be located at a different position from sensor unit 121.

The cleaning target area where the robot cleaner 100 moves may vary depending on the case. For example, the floor material of the cleaning target area may be provided in the form of marble or may be provided in the form of a hypocausted floor (such as linoleum). In addition, the floor may also be formed of other materials other than the above-described exemplary materials.

In order for the dust collector 2 to effectively suction dust, the driving strength of the dust collector 2 may vary depending on the material of the floor.

Specifically, in order to implement effective cleaning, the dust collector 2 should be operated more strongly in a carpeted area than a general floor area covered with a hypocausted floor. The controller of the robot cleaner 100 may be provided to adjust the operating strength of the dust collector 2 according to the type of flooring.

The obstacle sensor may determine the presence or absence of an obstacle in the cleaning target area. The obstacle sensor may be provided integrally with the above sensor unit 121 or may be provided separately from the above sensor unit 121. That is, the photographing sensor may also serve as an obstacle sensor.

As the obstacle sensor senses the presence of an obstacle, the driving path of the robot cleaner 100 may be changed. As the movement path of the robot cleaner 100 becomes complicated, the amount of battery consumption may be changed. In more detail, if there is an obstacle, the robot cleaner 100 may move to bypass the obstacle. At this time, the movement path of the robot cleaner 100 becomes longer. As the movement path of the robot cleaner 100 becomes longer, the amount of battery consumption required for cleaning the corresponding area may also increase.

The drive unit 3 will be described in detail with reference to FIGS. 2 to 6.

The drive unit 3 may include a buffer unit 312 provided so that the drive module 32 and the wheel 33 can move up and down within the wheel cover 31.

The buffer unit 312 may include a guide bar 3121 and an elastic member 3122.

The buffer unit 312 may be inserted into a through hole 312a provided in the wheel cover 31 such that the buffer unit 312 can be connected to the drive module 32.

The guide bar 3121 may be configured to guide the vertical movement of the drive module 32. The guide bar 3121 may be formed to extend in one direction, and may be disposed in a vertical direction from the wheel cover 31 after passing through the drive module 32.

As can be seen from the drawings, guide bars 3121 are formed to penetrate left and right sides of the drive module 32, respectively.

Upper and lower ends of the guide bar 3121 may be fixed to the wheel cover 31. In the drawings, the upper end of the guide bar 3121 may be fixed to the upper portion of the wheel cover 31 and the lower portion of the guide bar 3121 may be fixed to the lower portion of the wheel cover 31.

The elastic members 3122 may be provided to absorb shock when the drive module 32 moves up and down. The elastic members 3122 may be connected to the wheel cover 31 and the drive module 32, respectively.

Specifically, the elastic member 3122 may be formed as a coil spring surrounding the guide bar 3121, but is not limited thereto. It should be noted that various kinds of elastic members that can alleviate impact and allow the drive module 32 to move up and down can be applied to the present disclosure.

A buffer space 321 providing a space in which the buffer unit 312 can be accommodated may be provided in the drive module 32. The buffer unit 312 may be accommodated in the buffer space 321.

The wheel 33 may include a wheel body 331, one or more tread portions 332, and a cutout portion 333.

The wheel body 331 may be provided to be coupled to the drive module 32. The wheel body 331 may form the exterior appearance of the wheel 33. That is, the wheel body 331 may include a sidewall and a bead.

The tread portions 332 may be integrally formed with the wheel body 331, and may be provided in plural along a circumferential surface of the wheel body 331. The tread portions 332 may form a pattern of the wheel 33.

The thicknesses of the tread portions 332 may not be constant. That is, the portion located at the center of the wheel body 331 in the width direction of the tread portions 332 may be thicker than the portion located on both sides of the wheel body 331 in the width direction. For example, from among the tread portions 332, the shape of a contact surface contacting the road surface may be provided such that the portion located at the center of the wheel body 331 in the thickness direction has a large thickness and the portion located at both sides of the wheel body 331 in the thickness direction has a small thickness.

The height of each tread portion 332 may be provided at a specific height where the tread portions 332 are not in contact with the wheel cover 31 when the drive module 32 maximally contacts the wheel cover 31. This is because the robot cleaner has difficulty in smoothly moving within the cleaning target area in a situation where the tread portions 332 are in contact with the wheel cover 31.

Since, from among the tread portions 332, a portion 332 grounded to the road surface may be formed in an octagonal shape, the robot cleaner can stably perform moving and climbing.

Grip force or frictional force with the road surface may be changed according to the pattern shape of the tread portions 332, thereby changing the driving stability.

The tread portions 332 may be provided to be spaced apart from each other on the circumferential surface of the wheel body 331.

Each of the cutout portions 333 may be a portion formed in a curve between the tread portions 332.

The cutout portion 333 may be provided on the circumferential surface of the wheel body 331 to pass through the wheel body 331. The cutout portion 333 may be provided such that the rib portions 341 to be described later protrude outward from the wheel body 331 in the circumferential direction.

Each of the cutout portions 333 may be formed to have a width and thickness corresponding to the width and thickness of each of the rib portions 341 to be described later.

The drive unit 3 may include a rib member 34.

The rib member 34 may be provided as a separate member from the wheel 33. The rib member 34 may be detachably coupled to the wheel body 331.

The rib member 34 may include a ring portion 342 provided to be seated on the inner circumferential surface of the wheel body 331, and one or more rib portions 341 formed to extend from the ring portion 342 in the radial direction of the ring portion 342.

The ring portion 342 may be included in the wheel body 331 and may be integrally formed with the rib portions 341.

A plurality of rib portions 341 may be provided in the robot cleaner.

The rib portions 341 may protrude outward in the radial direction of the wheel 33 through the cutout portions 333 formed in the wheel body 331. That is, a plurality of cutout portions 333 may be formed in the wheel body 331, and the rib member 34 may be provided in a form in which the rib portions 341 protrude from the plurality of cutout portions 333.

The radius of the ring portion 342 may be formed slightly smaller than the inner diameter of the wheel body 331. That is, the ring portion 342 may be formed to have a predetermined tolerance with the size of the inner diameter of the wheel body 331.

As a result, the ring portion 342 can be accommodated to be in close contact with the inside of the wheel body 331. When the ring portion 342 is excessively smaller than the inner diameter of the wheel body 331, the length of each rib portion 341 may be excessively increased to prevent foreign substances from being caught between the rib portions 341, and it may be difficult for the rib member 34 to be stably accommodated in the wheel body 331.

The rib portion 341 may be smaller in width than the tread portion 332. In order for the rib portion 341 to have the same width as the tread portion 332, at least the cutout portion 333 should have the same width as the tread portion 332. However, since it is difficult to separately support each of the tread portions 332 on the wheel body 331, the cutout portion 333 may be smaller in width than the tread portion 332. In order for the rib portion 341 to be inserted into a space formed by the cutout portion 333, the thickness and width of the rib portion 341 are preferably smaller than the thickness and width of the space formed by the cutout portion 333.

However, in order for the rib portions 341 to prevent foreign substances from being caught therebetween, the size and shape of the cutout portions 333 may be similar to those of the rib portions 341. That is, the cutout portion 333 and the rib portion 341 may be provided to have a predetermined tolerance therebetween.

The rib portion 341 may have the same height as the tread portion 332, or may be provided to have a height less than that of the tread portion 332.

The rib portions 341 may be provided to prevent foreign substances from being caught therebetween. When the height of the rib portion 341 is greater than the height of the tread portion 332, the rib portions 341 may interfere with movement of the robot cleaner traveling in the cleaning target area.

Specifically, when the height of the rib portion 341 is greater than the height of the tread portion 332, rattling of the robot cleaner may occur while the robot cleaner is driving in the cleaning target area, resulting in poor driving stability and making effective cleaning impossible. Accordingly, the rib portions 341 may protrude less outward in the radial direction of the wheel 33 than the tread portion 332.

The number of rib portions 341 may not be the same as the number of cutout portions 333. That is, the rib portions 341 may be formed to be inserted into only some of the plurality of cutout portions 333. In other words, the number of rib portions 341 and the number of cutout portions 333 may not always be the same.

Therefore, the rib member 34 may be formed to have various shapes, so that the user's selection range can be widened.

The rib portions 341 may protrude outward in the radial direction of the wheel 33 so as to have the same height. When the rib portions 341 protrude outward to a uniform height, the effect of preventing foreign substances from being caught can be equally exerted throughout the wheel body 331, without being limited thereto.

At least one of the plurality of rib portions 341 may be provided to have a different height from the remaining rib portions 341.

The effect of preventing jamming of foreign substances may vary depending on the height of the rib portions 341. However, as the rib portions 341 protrude outward in the radial direction from the wheel 33 when the robot cleaner moves on stepped terrain, the climbing performance of the robot cleaner may be degraded. Thus, since the rib portions 341 are formed to have different heights, the robot cleaner can smoothly climb a stepped terrain even when, among the plurality of rib portions, some rib portions each having a smaller protrusion than the remaining rib portions 341 are caught on the stepped terrain.

The fact that the number of rib portions 341 is not equal to the number of cutout portions 333 means that the number of rib portions 341 and the number of cutout portions 333 are not necessarily different from each other.

That is, the plurality of rib portions 341 may be provided to correspond to the plurality of cutout portions 333, respectively.

FIG. 7 is a view illustrating various states of the drive unit of the robot cleaner according to an embodiment of the present disclosure.

FIG. 7 (a) is a view showing a state in which the wheel is retracted to the innermost side of the wheel cover, and FIG. 7 (b) is a view showing a state in which the wheel protrudes to the outermost side of the wheel cover.

For convenience of description, the state shown in FIG. 7 (a) will hereinafter be referred to as a first state, and the state shown in FIG. 7 (b) will hereinafter be referred to as a second state.

The first state may be a state in which the wheel of the robot cleaner is in contact with the road surface and the weight of the robot cleaner is transmitted to the wheel 33. In other words, the first state indicates a state in which the wheel is grounded on the floor to support the main body 1 of the robot cleaner.

That is, in the first state, the robot cleaner can normally travel or move in the cleaning target area.

The second state may be a state in which the weight of the robot cleaner is not transmitted to the road surface. In other words, the second state may represent a state in which the wheel 33 has lost contact with the floor. In more detail, like an example state in which some parts of the robot cleaner are unavoidably caught on the stepped terrain, it is difficult for the robot cleaner to normally move or travel in the cleaning target area regardless of rotation of the wheels 33.

The robot cleaner according to the embodiment may control rotation of the wheels 33 by determining whether the wheel 33 is in contact with the floor.

Specifically, when the robot cleaner enters the second state due to movement of the wheels 33 that have lost contact with the floor, driving of the drive motor 326 is stopped to prevent the wheels 33 from idling unnecessarily.

When the wheels 33 are in contact with the floor again, the drive motor 326 may be driven again to rotate the wheels 33. Accordingly, the wheels can be appropriately controlled according to the state of the robot cleaner.

Figure 8:
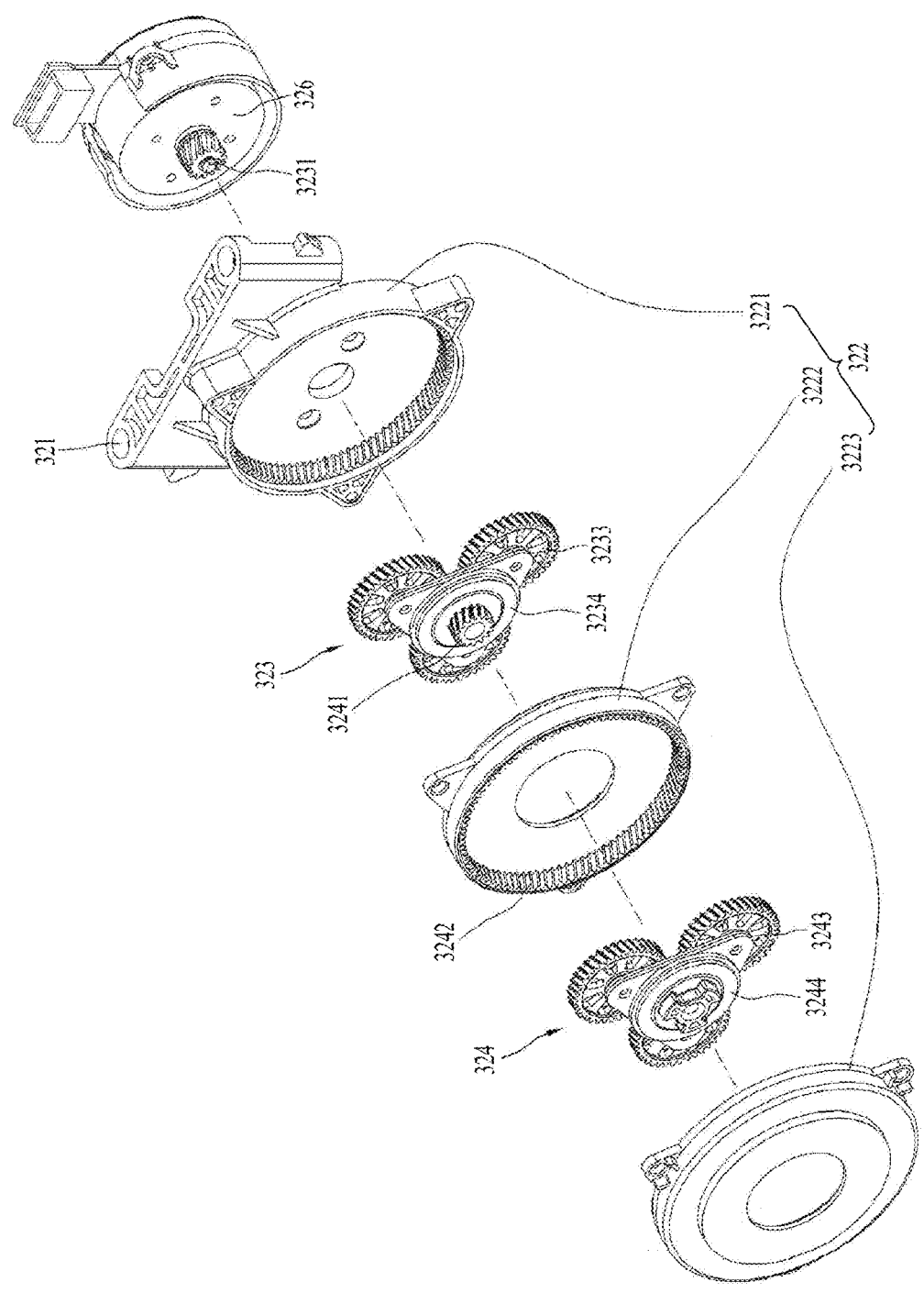
FIG. 8 is an exploded perspective view illustrating a drive module according to an embodiment of the present disclosure.

The drive module 32 will hereinafter be described with reference to FIG. 8.

The drive module 32 may be coupled to the wheel body 331 and the wheel cover 31. Specifically, the drive module 32 may be coupled to the wheel cover 31 to be movable vertically.

A buffer space 321 through which the guide bar 3121 passes may be formed in the case 322. The buffer spaces 321 may be formed at left and right sides of the case 322, respectively. The case 322 may be configured to be movable up and down along the guide bar 3121.

The drive motor 326 may be provided at one side of the case 322.

A planetary gear device may connect the drive motor 326 to the wheels 33, may decrease the rotational speed of the drive motor 326, and may transmit the decreased rotational speed to the wheels 33. The planetary gear device may be provided on the other side of the case 322. The planetary gear device may be composed of one or more stages. In these drawings, it is shown that the planetary gear device is composed of two stages, but the scope of the present specification is not limited thereto.

A sun gear may be mounted on a rotary shaft of the drive motor 326, and the wheel 33 may be mounted on a cage rotatably supporting a rotary shaft of each of the plurality of planetary gears. By the above-described structure, the rotary shaft of the drive motor 326 and the rotary shaft of each wheel 33 may be placed on the same axis.

A space capable of accommodating at least a portion of the drive module 32 may be formed in the wheel 33. The planetary gear device may be completely accommodated in the space, so that the circumference of the planetary gear device can be surrounded by the wheel 33. Therefore, the planetary gear device is not visible from the outside.

In this way, the gear device that reduces the rotation of the drive motor 326 and transmits the reduced rotation to the wheel 33 may be composed of a planetary gear device such that the rotary shaft of the drive motor 326 and the rotary shaft of the wheel 33 can be placed on the same axis, and the planetary gear device is accommodated in the wheel 33 such that the structure associated with the driving of the wheel 33 can be miniaturized, thereby contributing to miniaturization of the robot cleaner 100 or increase in volume of other components.

In order to obtain an appropriate reduction ratio, the planetary gear device may be composed of a combination of the first planetary gear unit 323 and the second planetary gear unit 324, that is, two stages. The first planetary gear unit 323 is interlocked with the rotary shaft of the drive motor 326. The second planetary gear unit 324 may interlock with the first planetary gear unit 323 and may be connected to the wheel 33.

Looking at the above-described structure in detail, the case 322 may include a main case 3221, a middle case 3222, and a front case 3223.

The main case 3221 may include a buffer space 321 through which the guide bar 3121 passes. The drive motor 326 may be mounted on one side of the main case 3221, and a first planetary gear unit 323 may be accommodated at the other side of the main case 3221. The rotary shaft of the drive motor 326 may be formed to penetrate the main case 3221.

The first planetary gear unit 323 may include a first sun gear 3231, a first ring gear, a plurality of first planetary gears 3233, and a first cage 3234.

The first sun gear 3231 may be coupled to the rotary shaft of the drive motor 326 and exposed to the other side of the main case 3221. The first sun gear 3231 may be configured to be rotatable in both directions according to a drive signal received from the controller.

The first ring gear may be formed at the other side of the main case 3221 to surround the first sun gear 3231. The first sun gear 3231 may be disposed at the center of the first ring gear. As can be seen from the drawings, the first ring gear may be formed in the main case 3221.

The plurality of first planet gears 3233 can engage with the first sun gear 3231 and the first ring gear, and at the same time can rotate and revolve around the first sun gear 3231. In this structure in which the first ring gear is fixed, the rotation direction of each of the first planetary gears 3233 is opposite to the rotation direction of the first sun gear 3231, and the revolving direction of the first planetary gear 3233 is the same direction as the rotation direction of the first sun gear 3231.

The first cage 3234 may rotatably support the rotary shaft of each of the plurality of first planetary gears 3233. The first cage 3234 may be disposed to cover a portion of each of the plurality of first planetary gears 3233. The first cage 3234 may be disposed to cover the first sun gear 3231. In this case, the first case 3234 may be configured to rotatably support the rotary shaft of the first sun gear 3231.

The middle case 3222 may be coupled to the main case 3221. One side of the middle case 3222 may be disposed to cover the first planetary gear unit 323, and the second planetary gear unit 323 may be accommodated in the other side of the middle case 3222. A hole for connection between the first planetary gear unit 323 and the second planetary gear unit 324 may be formed in the middle case 3222.

The second planetary gear unit 324 may include a second sun gear 3241, a second ring gear 3242, a plurality of second planetary gears 3243, and a second cage 3244.

The second sun gear 3241 may protrude from the first cage 3234, and may be exposed to the other side of the middle case 3222 through a hole.

The second ring gear 3242 may be formed on the other side of the middle case 3222 to surround the second sun gear 3241. The second sun gear 3241 may be disposed at the center of the second ring gear 3242. As can be seen from the drawings, the second ring gear 3242 may be formed in the middle case 3222.

The plurality of second planet gears 3243 can engage with the second sun gear 3241 and the second ring gear 3242, and at the same time can rotate and revolve around the second sun gear 3241. In this structure in which the second ring gear 3242 is fixed, the rotation direction of each of the second planetary gears 3243 is opposite to the rotation direction of the second sun gear 3241, and the revolving direction of the second planetary gear 3243 is the same direction as the rotation direction of the second sun gear 3241.

The second cage 3244 may rotatably support the rotary shaft of each of the plurality of second planetary gears 3243. The second cage 3244 may be disposed to cover a portion of each of the plurality of second planetary gears 3243. The second cage 3234 may be disposed to cover the first sun gear

3231. In this case, the second case 3244 may be configured to rotatably support the rotary shaft of the second sun gear 3241.

The front case 3223 may be coupled to the middle case 3222 and disposed to cover the second planetary gear unit 324. A hole for connection between the second planetary gear unit 324 and the wheel 33 may be formed in the front case 3223.

A protrusion inserted into the hole may be formed in the second cage 3244, and a coupling protrusion engaged with the coupling groove of the wheel 33 may be formed on the protrusion. The coupling protrusion may be engaged with the coupling groove 123*b* so that the wheel 33 receives the driving force through the planetary gear device and thus prevents the wheel 33 from idling unnecessarily during rotation of the wheel 33.

FIG. 9 is a view showing the rib member of the robot cleaner.

FIG. 9 (*a*) is a partial perspective view of the wheel 33, and FIG. 9 (*b*) is a partial cross-sectional view of the wheel 33.

The material of the wheel 33 is not limited, but in general, the wheel 33 may be made of a material having excellent elasticity such as rubber or urethane.

The rib member 34 may be made of a material having excellent elasticity. The rib member 34 may be made of a material capable of temporarily changing the degree of protrusion of the rib portion 341 protruding outward in the radial direction of the wheel 33. As a result, the climbing performance of the robot cleaner can be prevented from being deteriorated.

However, the type of the rib member 34 is not limited thereto. That is, the rib member 34 may be made of the same material as the tread portion 332, and may be made of a material different from that of the tread portion 332.

When the tread portion 332 and the rib member 34 are formed of the same material, manufacture of the tread portion 332 and the rib member 34 can be facilitated. Even if the tread portion 332 and the rib member 34 are made of the same material, the tread portion 332 and the rib member 34 may have different thicknesses or shapes.

The tread portion 332 is a portion provided to stably perform driving of the robot cleaner 100 through contact with the road surface, and the rib member 34 prevents foreign substances from being caught between the tread portions 332. Since the rib member 34 prevents foreign substances from being caught between the tread portions 332, it is undesirable that the tread portion 332 and the rib member 34 be provided to have the same shape.

The tread portion 332 and the rib member 34 may be formed of different materials. As described above, since the roles of the tread portion 332 and the rib member 34 are different from each other, the rib member 34 is not necessarily formed of the same material as the tread portion 332.

That is, the tread portion 332 and the rib member 34 may be formed of materials having different hardnesses. Specifically, the hardness of the tread portion 332 may be greater than that of the rib portion 34.

The rib portion 334 is a portion provided to prevent foreign substances from being caught between the rib member 34 and the tread portions 332. In a situation where foreign substances such as wires are caught between the rib member 34 and the tread portion 332, in order to easily remove such foreign substances, the rib portion 34 is preferably provided to be bent with little force. On the other hand, it is preferable that the tread portion 332 is not easily bent for stable driving of the robot cleaner.

Specifically, the tread portion 332 is preferably provided so as not to be bent by the weight of the robot cleaner.

Of course, even if the rib member 34 is made of the same material as the tread portion 332, since the tread portion 332 and the rib member 34 are different in thickness from each other, the tread portion 332 is provided so as not to be bent by the weight of the robot cleaner as described above, and the rib portion 334 can be provided to be easily bent by the user's hand.

However, when the tread portion 332 and the rib member 34 are made of the same material, the thicknesses and shapes of the tread portion 332 and the rib member 34 should be adjusted such that the tread portion 332 does not bend even under the weight of the robot cleaner, and the rib member 34 should be formed such that the user can easily remove the foreign substances, such that the manufacturer's selection range may be narrowed.

Therefore, since the tread portion 332 and the rib member 34 are formed of different materials, the size and shape of the wheel 33 can be freely selected.

FIG. 10 is a view illustrating a climbing state of the robot cleaner according to an embodiment of the present disclosure.

Referring to FIG. 10, the rib member 34 of the robot cleaner may be provided to be inserted into the wheel 33 when moving on stepped terrain.

Specifically, when external force is applied to the rib member 34, the rib member 34 can be temporarily inserted into the wheel body 331. As the rib portion 341 is inserted into the wheel body 331, the ring portion 342 is also provided to be depressed inside the wheel body 331.

As described above, since the rib member 34 is made of a material having elasticity, the rib member 34 can be restored to its original position when external force is removed therefrom.

That is, when climbing of the robot cleaner is finished, external force may be removed, and when the external force is removed, each of the rib portions may protrude to its original position. As a result, the rib portions can again normally play a role of preventing foreign substances from being caught.

Since the rib member 34 is provided, foreign substances may be prevented from being caught between the tread portions 332, but climbing performance of the robot cleaner may be deteriorated due to the rib member 34. In general, when the robot cleaner moves on stepped terrain, the robot cleaner is caught on the stepped terrain between the tread portions 332, but the robot cleaner can climb the stepped terrain because the tread portions 332 push the terrain.

When the rib member 34 is provided, the space formed between the tread portions 332 has difficulty in settling on stepped terrain. Accordingly, the rib member 34 may be provided to be inserted into the wheel body 331 even if the rib member 34 is caught on the stepped terrain.

If the rib member 34 is provided to be inserted into the wheel 33 when the load of the robot cleaner is transmitted to one surface of the rib portions 341, the effect of preventing jamming of foreign substances and the effect of preventing degradation of the climbing performance can be simultaneously obtained.

At this time, one surface of the rib portion 341 means a surface that is pressed by a stepped terrain when the wheel 33 rotates. Since the rib portion 341 is provided to correspond to the shape of the cutout portion 333, the rib portion 341 may be repeatedly retracted and restored even when external force is not necessarily applied in the direction consistent with the radial direction of the wheel 33.

That is, the rib portions 341 may equally pass through the cutout portions 333 regardless of the direction along which external force is applied.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

The invention claimed is:

1. A robot cleaner comprising:
a main body that forms an exterior appearance of the robot cleaner;
a wheel cover detachably provided to the main body;
a drive module movably coupled to the wheel cover; and
a wheel coupled to the drive module and rotated by receiving driving force from the drive module;
wherein the wheel includes:
a wheel body coupled to the drive module and forming an exterior appearance of the wheel;
tread portions spaced apart from each other along a circumferential surface of the wheel body;
cutout portions formed between the tread portions at the circumferential surface of the wheel body; and
a rib member including a ring portion accommodated in the wheel body and rib portions protruding outward through the cutout portions from the ring portion in a radial direction of the wheel,
wherein the ring portion is formed of a ring-shaped elastic material and is positioned radially inwardly of the wheel body,
wherein the rib portions extend from the ring portion through the wheel body to be positioned at the cutout portions, and
wherein, when force is applied radially to the rib portions, the ring portion is elastically deformed, and the rib portions are drawn into the wheel body.

2. The robot cleaner according to claim 1, wherein the rib member is elastically restored to an original position thereof when the force is removed after the rib portions are inserted into the wheel body.

3. The robot cleaner according to claim 1, wherein the rib portions are provided to have a same height as the tread portions.

4. The robot cleaner according to claim 1, wherein each of the rib portions is provided to have a lower height than each of the tread portions.

5. The robot cleaner according to claim 1, wherein each of the rib portions is provided to have a smaller width than each of the tread portions.

6. The robot cleaner according to claim 1, wherein a thickness and a width of each of the rib portions is smaller than a thickness and a width of a space formed between adjacent cutout portions.

7. The robot cleaner according to claim 1, wherein the drive module is provided to be movable up and down in the wheel cover, and
wherein each of the rib portions is provided to have a specific height where the rib portions are not in contact with the wheel cover in a state where the drive module is maximally in close contact with the wheel cover.

8. The robot cleaner according to claim 1, wherein the rib member is detachably coupled to the wheel body.

9. The robot cleaner according to claim 1, wherein each of the cutout portions is provided between the tread portions, and wherein a number of the rib portions is the same or less than a number of the cutout portions.

10. The robot cleaner according to claim 1, wherein the rib portions protrude outward in the radial direction of the wheel so as to have a same height.

11. The robot cleaner according to claim 1, wherein each of the cutout portions is provided between the tread portions, and wherein each of the rib portions is provided in each of the plurality of cutout portions, and at least one of the rib portions has a height different from other rib portions.

\* \* \* \* \*